H. B. BABSON.
MILKING MACHINE.
APPLICATION FILED FEB. 9, 1920.
1,383,369.
Patented July 5, 1921.
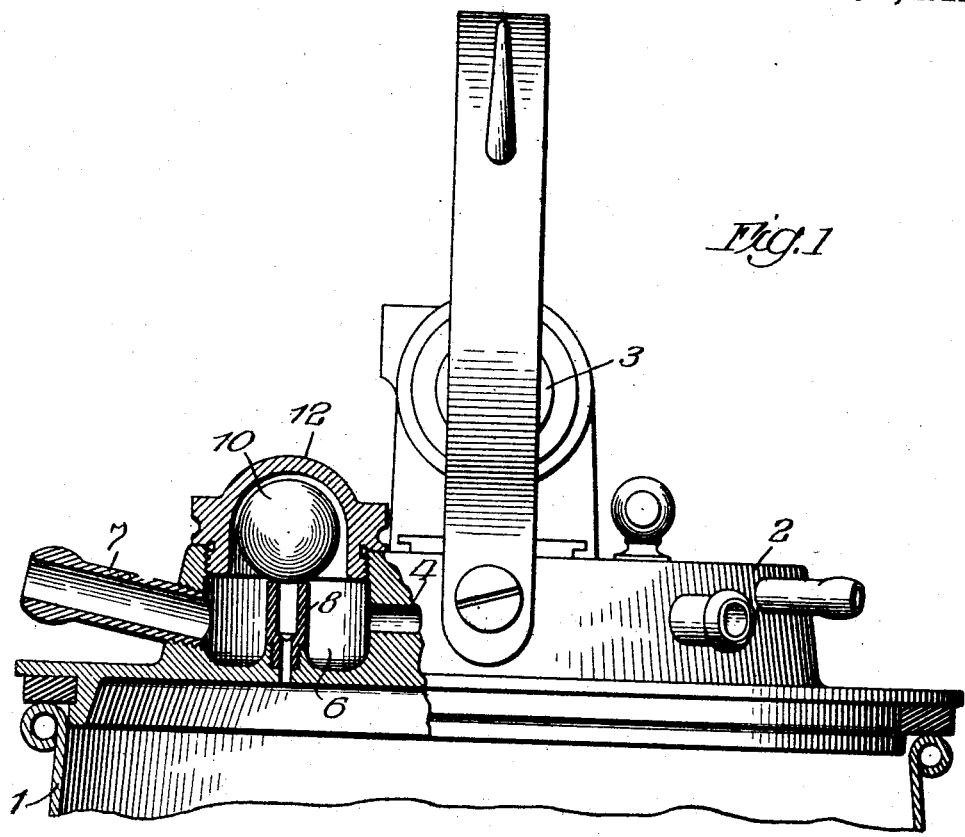
Fig.1
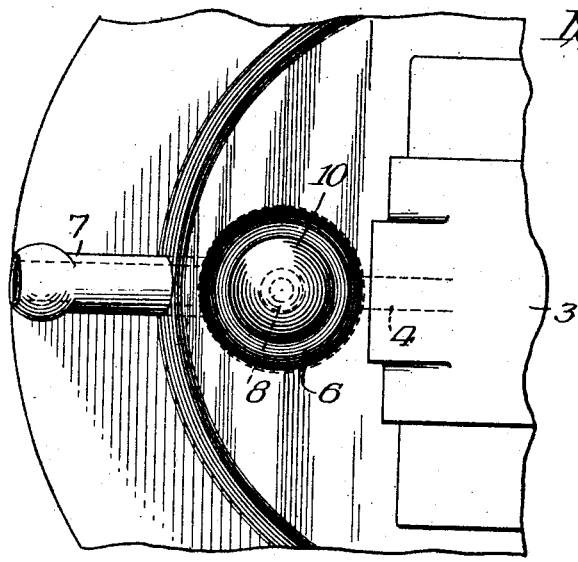
Fig.2
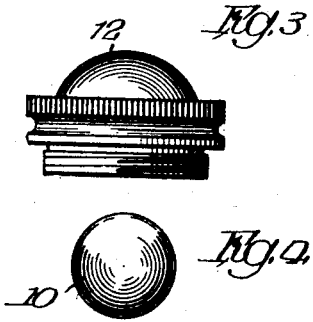
Fig.3
Fig.4
Inventor
HENRY B. BABSON
By, Cheever & Cox Attys

UNITED STATES PATENT OFFICE.

HENRY B. BABSON, OF CHICAGO, ILLINOIS, ASSIGNOR TO PINE TREE MILKING MACHINE COMPANY, OF CHICAGO, ILLINOIS, A CORPORATION OF ILLINOIS.

MILKING-MACHINE.

1,383,369.   Specification of Letters Patent.   Patented July 5, 1921.

Application filed February 9, 1920. Serial No. 357,342.

*To all whom it may concern:*

Be it known that I, HENRY B. BABSON, a citizen of the United States, residing at Chicago, in the county of Cook and State of Illinois, have invented a certain new and useful Improvement in Milking-Machines, of which the following is a specification.

My invention relates to milking machines of the type in which the milk pail is maintained under partial vacuum. In the usual construction the pail has a removable cover and the air is exhausted out through it. The general object of the invention is to provide a good construction for preventing drainage from the air exhaust passages back into the pail. A trap designed for the same general purpose is shown in Patent No. 1,344,140 for milking machines issued to Arthur C. Macartney, June 22, 1920. In the form shown in that patent a cylindrical valve is contained within and seated upon a shell which constitutes a separate and removable element of the combination. Furthermore, the valve seat is located on a level with the bottom of the trap chamber. It is my purpose to eliminate all possibility of leakage of milk or any undesirable elements back into the partially exhausted pail.

I obtain my object by the mechanism illustrated in the accompanying drawing in which—

Figure 1 is an assembly view of a milk pail cover and associated parts including the trap, which latter is shown in vertical axial section.

Fig. 2 is a top plan view of the parts shown at the left portion of Fig. 1, the cap being removed to reveal the parts beneath it.

Fig. 3 is an edge view of the cap, and

Fig. 4 is a view of the ball valve.

Like numerals denote like parts throughout the several views.

In the illustrated form of the invention I have indicated the upper portion of a milk pail 1 provided with a milk pail cover 2. In their general characteristics they are of known design and need not be described further than to say that a pulsator 3 is mounted upon the top of the cover and is subjected to suction through a passage 4 formed in the cover. Said passage communicates with a chamber 6 formed in the cover and air is drawn out from it through what is frequently termed a "suction nipple" 7. This forms the eduction passage and in practice is connected by a hose or otherwise to the vacuum tank commonly employed in connection with milking machines.

At the center of the chamber 6 is an upright tube 8 which is open at the top and communicates at the bottom with the inside of the pail. While the specific design may be varied, I prefer to perform the tube of a separate piece screwed or otherwise rigidly fastened to the floor of the chamber as shown in Fig. 1. Resting upon the top of the tube is a ball 10 which in practice may be of polished metal and of a diameter of approximately three-quarters of an inch. This forms a check valve to prevent air from flowing in the reverse direction.

The ball is compelled to maintain its position by means of a retainer in the form of a screw cap 12 which forms a closure for the chamber and is concave on the under side so as to permit a slight amount of play for the ball, but prevent it from becoming dislodged from the tube. Generally speaking, it may be said that the cap is so designed that it will prevent the center of gravity of the ball falling outside of the circle at the outer diameter of the tube when the milk pail is held approximately in normal upright position.

It will be noted that in my construction the top of the tube 8 is well above the level of the inner end of the nipple 7. Consequently, if the exhaust pump is working, if milk should collect in the chamber it will be drawn off through the nipple before it can rise to the level of the top of the tube. This effectually prevents flow back into the pail. If the pump stops working and there should be any milk in the air conduit which would drain back into the chamber 6, said chamber will retain the milk up to its capacity, that is, until the level of the milk rises above the top of the tube.

By having the tube securely fastened at the bottom, there is no danger of leakage at that point. Again, the valve seat (which in this case is the top of the tube) is not on a level with the bottom of the trap chamber, but high above it, which also reduces the danger of leakage.

It will be observed that there is sufficient space between the sides of the tube and the walls of the chamber to readily afford access for cleaning purposes.

An advantage in employing a ball as a valve is that it has a large wearing surface and as it is free to shift its position there is no tendency for it to wear at one point any more than at another. Consequently it need never be reground or receive any other special attention.

Having thus described my invention what I claim as new and desire to secure by Letters Patent, is:—

1. A milking machine having a milk pail provided with a cover having an eduction passage for the exit of the air from the pail and a chamber from which said passage leads, a tube leading from the under side of the cover to a point considerably above the floor of said chamber, and a floating check valve detached from its surroundings and resting upon the top of said tube.

2. A milking machine having a milk pail provided with a cover having an eduction passage for the exit of the air from the pail and a chamber from which said passage leads, a tube leading from the under side of the cover to a point considerably above the floor of said chamber, a ball resting upon the top of said tube, and means for holding said ball loosely upon said tube.

3. A milk trap for the pail covers of milking machines having a chamber in the cover and an eduction passage leading from a point near the floor of said chamber, a tube in said chamber spaced from the walls thereof, said tube communicating with the inside of the pail and terminating considerably above the floor of the chamber, a ball resting upon the upper end of said tube and a concave cap at the top of the chamber spaced from the ball sufficiently to permit it to move relatively to the tube and being close enough to prevent the center of gravity of the ball from falling outside the outer diameter of the tube.

In witness whereof I have hereunto subscribed my name.

HENRY B. BABSON.